(12) United States Patent
Harrington

(10) Patent No.: US 7,235,204 B2
(45) Date of Patent: Jun. 26, 2007

(54) METHODS AND APPARATUS FOR PRODUCING MANUFACTURED ARTICLES HAVING NATURAL CHARACTERISTICS

(75) Inventor: Bruce E. Harrington, Superior, CO (US)

(73) Assignee: PolyRock Technologies, LLC, Greenwood Village, CO (US)

( * ) Notice: Subject to any disclaimer, the term of this patent is extended or adjusted under 35 U.S.C. 154(b) by 397 days.

(21) Appl. No.: 10/236,667

(22) Filed: Sep. 6, 2002

(65) Prior Publication Data

US 2004/0046280 A1    Mar. 11, 2004

(51) Int. Cl.
*B29C 39/02* (2006.01)

(52) U.S. Cl. .................... 264/219; 29/458; 264/245; 264/299

(58) Field of Classification Search ............. 264/219, 264/220, 225, 226, 51, 227, 245, 299; 29/458
See application file for complete search history.

(56) References Cited

U.S. PATENT DOCUMENTS

| | | | |
|---|---|---|---|
| 3,641,228 A | | 2/1972 | Fleck |
| 3,723,584 A | * | 3/1973 | Nussbaum ............... 264/46.6 |
| 3,883,627 A | | 5/1975 | Fitts |
| 3,977,933 A | * | 8/1976 | Sadashige ............... 156/250 |
| 4,183,188 A | * | 1/1980 | Goldsby ............... 52/596 |
| 4,381,963 A | | 5/1983 | Goldstein et al. |
| 4,385,088 A | | 5/1983 | Baskin |
| 4,483,813 A | * | 11/1984 | Longo ............... 264/225 |
| 4,529,562 A | | 7/1985 | Connett et al. |
| 4,735,754 A | | 4/1988 | Buckner |
| 4,752,229 A | | 6/1988 | Clingerman et al. |
| 4,860,815 A | * | 8/1989 | Parker et al. ............... 164/47 |
| 4,940,558 A | | 7/1990 | Jarboe et al. |
| 4,960,622 A | | 10/1990 | Jarboe et al. |
| 5,250,250 A | | 10/1993 | Gorski |
| 5,268,137 A | | 12/1993 | Scott et al. |
| 5,372,869 A | | 12/1994 | Drexinger et al. |
| 5,380,478 A | | 1/1995 | East |
| 5,543,100 A | | 8/1996 | Kluh et al. |
| 5,750,583 A | | 5/1998 | Gansen et al. |
| 5,911,927 A | | 6/1999 | Roberts |

(Continued)

FOREIGN PATENT DOCUMENTS

EP    0985507    3/2000

OTHER PUBLICATIONS

Bob Hamon, *Manufacturing Polyurethane Picture Frames*, Feb. 2000, pp. 74-79.

*Primary Examiner*—Allan R. Kuhns

(57) ABSTRACT

A method for making a thermosetting polymer reproduction of an object preferably comprises the steps of modifying an original object such as an object found in nature (e.g., a stone or array of stones) or a manmade article (e.g., a carved decorative object) to a predetermined configuration, making a first mold of at least part of the surface of the original object, filling the first mold with a first thermosetting polymer material to produce a reproduction of at least part of the surface of the original object, modifying the reproduction to a predetermined configuration, making a second mold from the modified reproduction and filling this second mold with a thermosetting polymer material to produce a reproduction of at least part of the surface of the original object. The second mold can be used repeatedly to produce reproductions in commercial quantities.

43 Claims, 14 Drawing Sheets

U.S. PATENT DOCUMENTS

| | | |
|---|---|---|
| 6,042,766 A | 3/2000 | Bahr |
| 6,093,356 A * | 7/2000 | Albertelli .................... 264/247 |
| 6,139,786 A | 10/2000 | Corry |
| 6,607,683 B1 * | 8/2003 | Harrington .................. 264/227 |

* cited by examiner

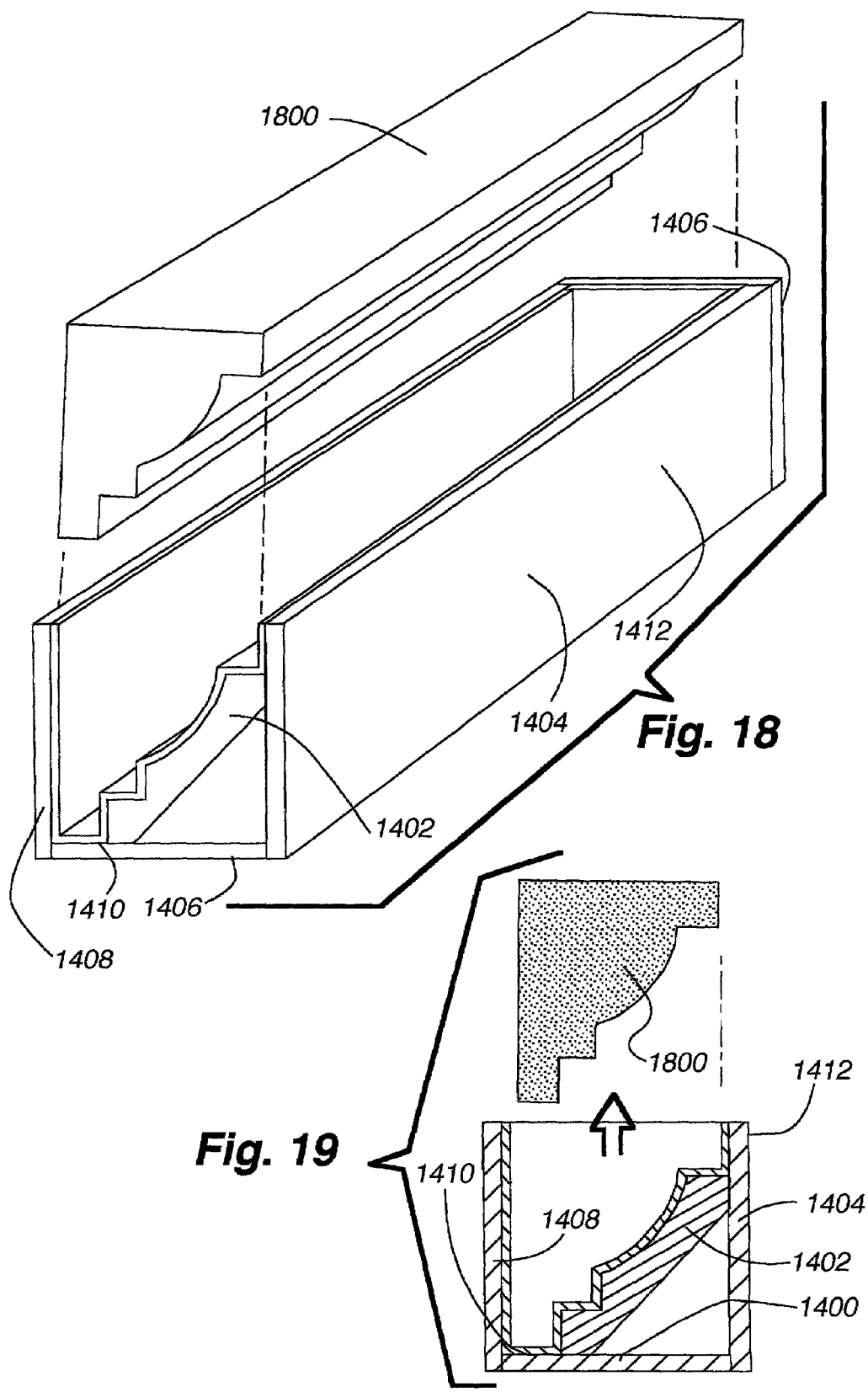

METHODS AND APPARATUS FOR PRODUCING MANUFACTURED ARTICLES HAVING NATURAL CHARACTERISTICS

BACKGROUND OF THE INVENTION

1. Field of the Invention

The invention of this application relates to the field of manufactured articles having the characteristics of natural articles. More particularly, this invention relates to methods and apparatus for producing a plastic article with some of the contours and colors of natural articles, and then employing a unique process to imbue the plastic article with corners, edges, and shapes not found in those natural articles, thereby creating a master part representing a state of the art previously unknown, and using this master part to manufacture plastic reproductions in commercial quantities.

2. Discussion of the Background

Many people have attempted to manufacture plastic parts simulating the contours and colors of natural articles, but either produce an item that does not look authentic or that poorly reproduces the natural article in its entirety. One example is Formica®, a hard plastic substrate used to cover countertops and the like. Some forms of Formica® were impregnated during manufacture with dyes or other colored material to simulate the look of wood or stone. But the simulation was not convincing because the Formica® was flat. It did not have the texture of the natural articles it purported to simulate.

Another example is Corian®. This was made from plastic in the form of sheets of varying thickness for use as countertops and related structures. The resulting product was colored much like the filler material used during manufacture. Some forms of Corian® were made to resemble stone. But the simulation was not convincing because Corian® was largely flat. It did not have the texture of the natural articles it purported to simulate.

Yet another example is Linoleum®. This was made from various plastics and fillers, and was sold in the form of sheets or rolls, principally for covering floors with a wear-resistant surface. While some forms of Linoleum® were colored and textured to resemble natural articles, the simulation was not convincing. The colors were artificial and the texture so regular as to dispel the notion of a natural article.

Still another example is plastic floor tiles. These were typically squares of regular size. They were intended to be butted against one another once a mastic had been applied, and some were both colored and textured to resemble natural articles. However, the colors were often unconvincing. And the same was true for the textures, which were not only shallow, but also discontinuous where one tile butted up against another.

Another example is exterior siding designed to replace or cover some or all of the exterior of outdoor structures, including houses. This siding typically was made of plastic or aluminum and was marked or embossed in an effort to simulate natural articles. But the simulation was not convincing. The colors were unconvincing and the textures were not only shallow and unrealistic, but also discontinuous where one piece of siding butted up against another.

Another example is cultured stone. This was cast from cement and aggregate and simply mimicked the characteristics of real stone. It could not be molded any differently from the natural article, and required the same methods for installation as real stone.

Processes for casting plastics are disclosed in U.S. Pat. No. 5,750,583 to Gansen et al. and U.S. Pat. No. 3,883,627 to Fitts. Gansen et al. disclosed a process for the preparation of polyurethane products in which a plastic film was positioned in a mold, the mold was closed, a polyurethane reaction mixture was injected into the mold, and the product was removed from the mold once the reaction mixture had fully reacted.

Fitts disclosed a process in which a heat curable elastomeric sheet comprising a curing agent and either urethane elastomeric gum stock or silicone gum stock was placed over a master to be copied; the heat curable elastomeric sheet was one that did not cause inhibition between the master and the heat curable elastomeric sheet. Next, the elastomeric sheet was vacuum drawn against the master and the master sheet material was enclosed in a frame. Next, a foamed polymeric backing was formed in situ to force the heat curable elastomeric sheet against the master to copy the shape of the master in the heat curable elastomeric sheet, which was then cured in the shape of the master. Finally, articles were molded in the shape of the master in a mold constructed from the cured elastomeric sheet material.

A decorative plastic moulding was disclosed in U.S. Pat. No. 5,372,869 to Drexinger et al. The moulding comprised two moulding pieces, each with a decorative face, a back, two sides and two ends. Each end of each piece had a 45 degree angle pre-mitered cut relative to the plane of the decorative face, with the pre-mitered cuts of each piece being in parallel planes. Each side of each piece was in a plane at a 45 degree angle to the plane of the decorative face, with the side planes converging at a position spaced from the back of the piece. The two moulding pieces were made of fire rated polyurethane.

Finally, a method for molding an artificial rock was disclosed in U.S. Pat. No. 4,940,558 to Jarboe et al. This method entailed selecting a rock for reproduction, creating a flexible rubber mold and supporting cradle having a mold cavity conforming to the exterior of said rock, the mold having a substantial degree of flexibility and being created by applying an uncured liquid rubber forming material to said rock, curing the uncured liquid rubber forming material to produce the rubber mold, the cradle being formed by applying by spraying a low density urethane foam forming mixture to the exterior of the rubber mold to provide a self-supporting cradle, spraying a two-sided urethane composition into the mold cavity, said urethane composition comprising an isocyanate side and a polyol side and being mixed in a spray gun in a spray-in-mold process, carrying out the spraying to build up the molded artificial rock to a desired thickness and stripping the cradle and mold after curing.

SUMMARY OF THE INVENTION

Generally speaking, the invention of this application comprises methods and apparatus for producing manufactured articles or reproductions with characteristics of natural articles. These reproductions can replicate the contours and colors of all or part of a natural article and can be made in any shape or size. Steps in making these reproductions include the production of a mold of the natural article, with or without modification. This is followed by production of a master reproduction from the mold, typically by casting. The master reproduction is used to form another mold from which commercial quantities of commercial reproductions can be made. These reproductions represent a state of the art previously unknown.

One method of the invention for making reproductions that replicate the surface of a natural article comprises the steps of modifying a natural article to a predetermined configuration, making a mold of at least part of the modified natural article, and filling the mold with a castable material to produce a reproduction of at least part of the surface of the modified natural article. Next, the reproduction is modified to a predetermined configuration to make a master reproduction. Finally, another mold is made from the master reproduction and this mold is filled with a castable material to produce another reproduction of at least part of the surface of the modified natural article. This second mold can be used to produce reproductions in commercial quantities.

Another method of the invention for making reproductions that replicate the surface of a natural article comprises the steps of making a mold of at least part of the surface of a natural article and then lining the inner surface of a support structure with the mold so that the surface of the mold that replicates the surface of the natural article faces away from the inner surface of the support structure. Next, the support structure is filled with a castable material to produce a master reproduction of the lined inner surface of the support structure. Finally, the master reproduction and a mold is made of the master reproduction. This mold can be used to produce reproductions in commercial quantities.

Apparatus of the invention includes a system for continuous production of cast reproductions that replicate the surface of a natural article. This system comprises a conveyor, one or more molds positioned on the conveyor, each of which replicates on at least part of its surface the surface of a natural article, a dispenser positioned adjacent top the conveyor for filling one or more of the molds with a castable material, and another conveyor positioned adjacent to the first conveyor for confining castable material to the molds. This system can further comprise one or more dispensers of paint, powdered coloring agents, or solvent positioned adjacent to the first conveyor, as well as a heater for heating the molds and drying any paint, coloring agent or solvent placed in the mold.

Yet another method of the invention for continuous production of cast reproductions that replicate the surface of a natural article comprises the steps of placing on a conveyor at least one mold that replicates on at least part of its surface the surface of the natural article, conveying the mold to a dispenser of castable material, filling the mold from the dispenser with castable material, and confining the castable material to the mold. The latter step can be accomplished by use of a second conveyor positioned adjacent to the first conveyor.

These methods and apparatus can be practiced or configured in a number of variations. Molds can be placed in rigid support structures to facilitate casting of manufactured reproductions in commercial quantities. The rigid support structure can be made of metal, wood or the like and lined with an inert material to prevent adhesion of castable material to the rigid support structure.

A reproduction can be colored by placing a powdered coloring agent or a paint (or both) into a mold before the mold is filled with castable material. In another variation, a powdered coloring agent is mixed into the castable material before the mold is filled with the castable material.

BRIEF DESCRIPTION OF THE DRAWINGS

FIG. 1 depicts four pieces of a natural article, in this case stone.

FIG. 2 depicts the stone pieces with grout strips added.

FIG. 3 depicts the stone pieces surrounded by a wooden dam.

FIG. 4 depicts the stone pieces after silicon has been poured over them.

FIG. 5 depicts the removal from the stone pieces of the silicone mold after it has cured.

FIG. 6 depicts the silicone mold from the top.

FIG. 7 depicts a polyurethane reproduction made from the silicon mold and subsequently modified to generate a master by removing material from two sides to produce an undercut.

FIG. 8 depicts a detail of the undercut of FIG. 7.

FIG. 9 depicts a detail of the fit between two polyurethane reproductions.

FIG. 10 depicts a second silicone mold made from the polyurethane reproduction.

FIG. 11 depicts the second silicone mold placed in a closable steel support mold.

FIGS. 12 through 25 below relate to two other embodiments of the invention of this application:

FIG. 12 depicts a piece of stone onto which silicone has been poured.

FIG. 13 depicts the removal from the stone of the silicon sheet after it has cured.

FIG. 14 depicts a preshaped wooden mold lined with the silicone sheet.

FIG. 15 depicts a side view of the assembly of FIG. 14.

FIG. 16 depicts the assembly of FIG. 14 filled with polyurethane casting plastic.

FIG. 17 depicts a side view of the assembly of FIG. 16.

FIG. 18 depicts the removal of the cast polyurethane master reproduction from the assembly of FIG. 14.

FIG. 19 depicts a side view of the removal of the master reproduction from the assembly of FIG. 14.

FIG. 20 depicts the master reproduction.

FIG. 21 is a side view of the master reproduction of FIG. 20 supported by a wooden board.

FIG. 22 depicts the master reproduction of FIG. 20 placed into a second wooden mold into which silicon rubber has been poured.

FIG. 23 depicts the resulting silicone rubber mold placed in a closable steel support mold for support during casting of polyurethane plastic reproductions.

FIG. 24 depicts the assembly of FIG. 23 filled with polyurethane casting plastic to produce a cast polyurethane reproduction.

FIG. 25 depicts a machine for the continuous production of polyurethane reproductions.

DETAILED DESCRIPTION OF THE INVENTION

Figure 1:
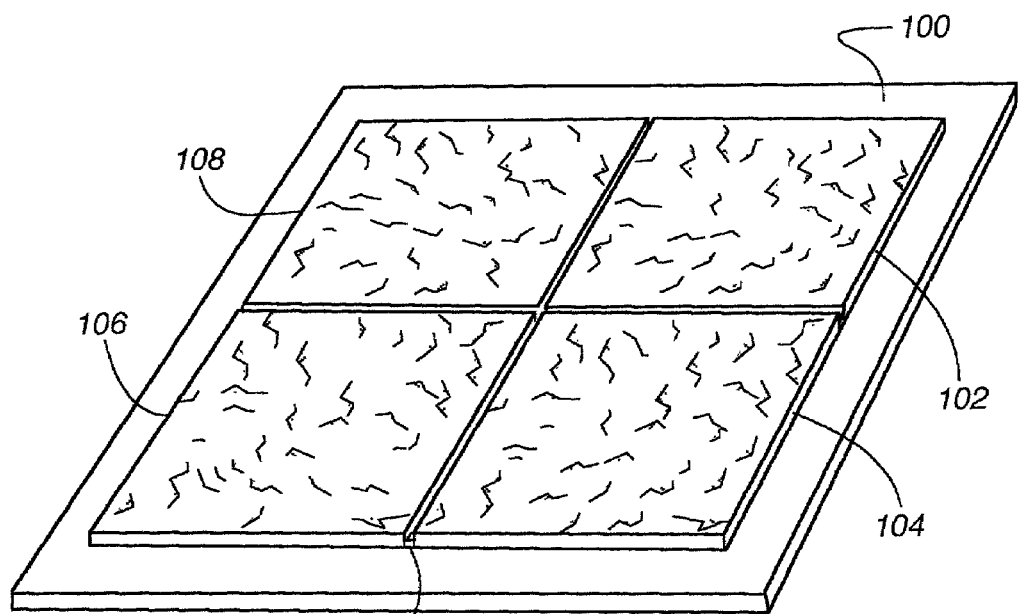
FIGS. 1 through 11 below relate to one embodiment of the invention of this application.

While the invention is susceptible to various modifications and alternative forms, specific embodiments are shown by way of example in the drawings and are described in detail below. The description and drawings are not intended to limit the invention to the particular embodiments disclosed. On the contrary, the invention embraces all modifications, equivalents, and alternatives falling within the spirit and scope of the invention as defined by the appended claims.

FIGS. 1 through 11 depict one preferred embodiment of the invention of this application. The process described is for making flat panel reproductions for use vertically in structures. These replicate panels replicate the surface of natural stone in a form that would be difficult or impossible to make with natural stone.

In FIG. 1, flagstones 102, 104, 106 and 108 are supported by wooden board 100. Grout has been placed in the spaces between flagstones 102, 104, 106 and 108 to produce filler 110.

Figure 2:
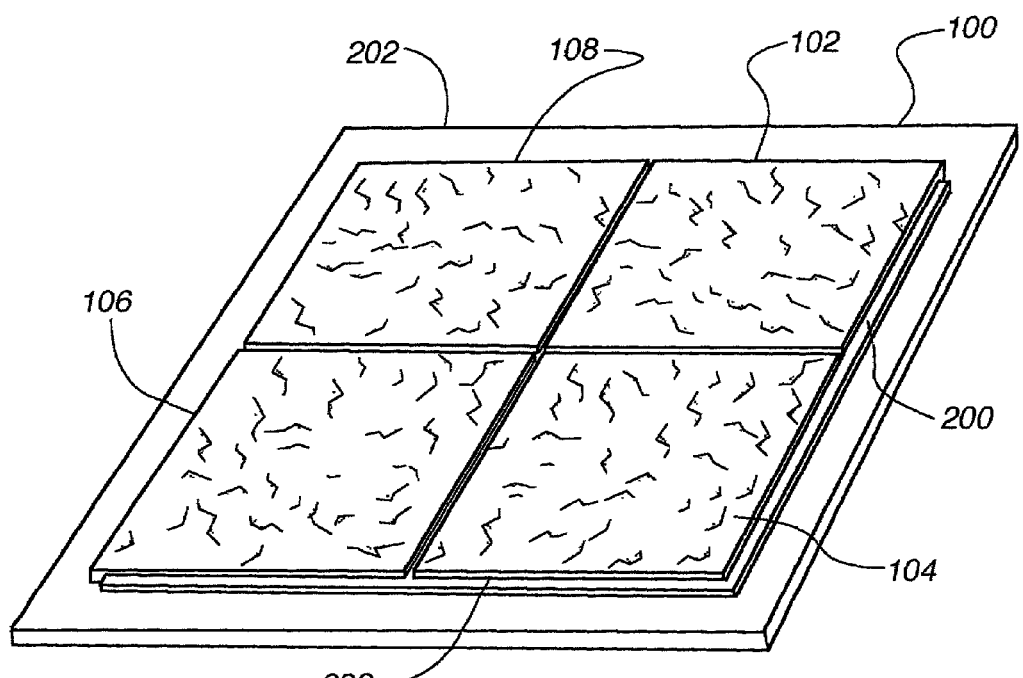

In FIG. 2, group strips 200 and 202 have been added along two contiguous sides of flagstones 102, 104, 106 and 108. These facilitate the production of replicates that will lock together when assembled in quantity.

Figure 3:
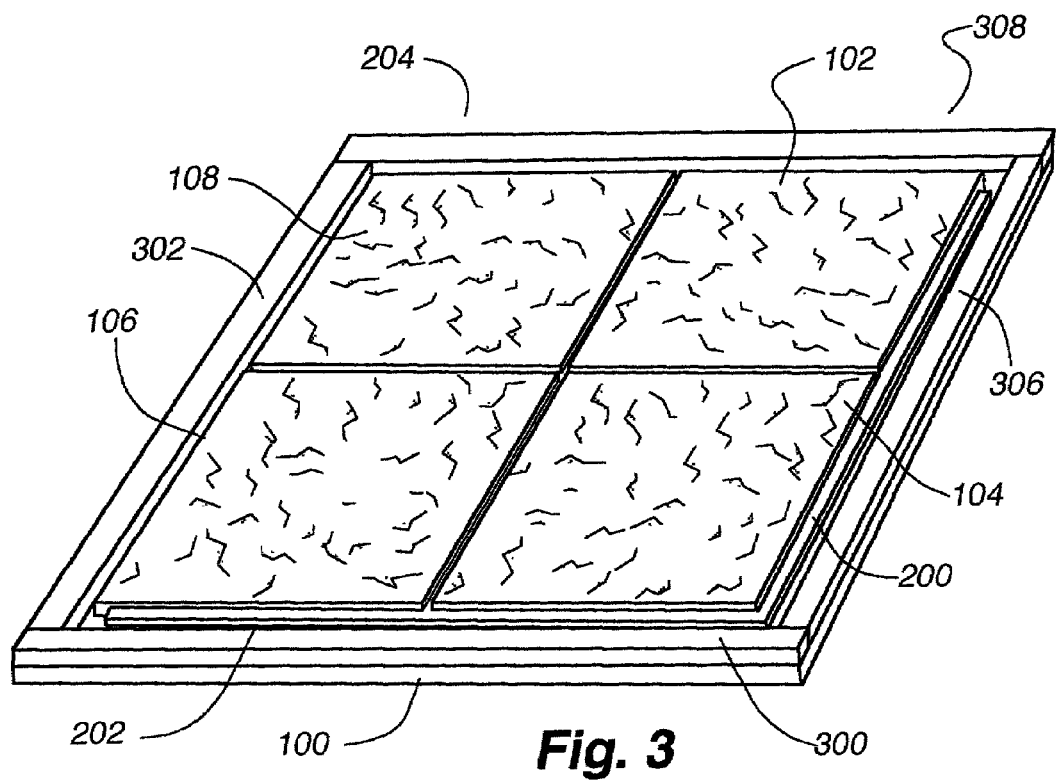

In FIG. 3, the flagstone assemblage 204 has been walled in with wood strips 300, 302, 304 and 306. These contain the liquid silicone used to make a mold of the flagstone assemblage 204.

Figure 4:
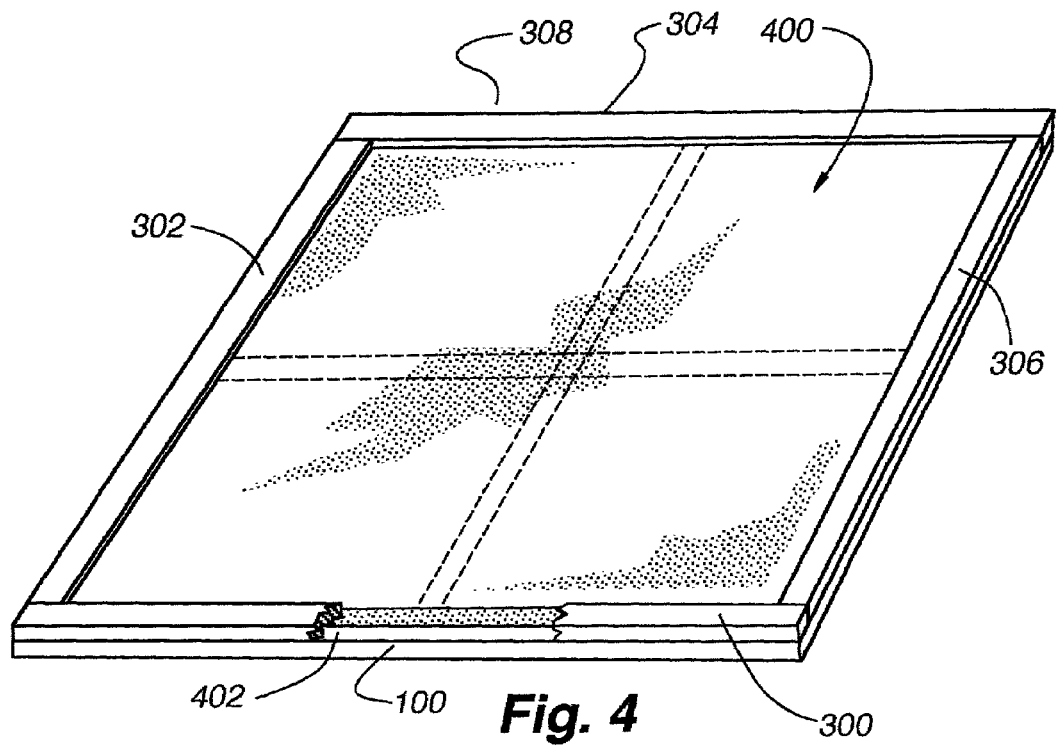

In FIG. 4, uncured silicon 400 has been poured into the receptacle made up of flagstone assemblage 204 and a frame made up of wood strips 300, 302, 304 and 308. In this view, wood strip 300 has been cut away at area 402 to illustrate the structure of frame 308.

Figure 5:
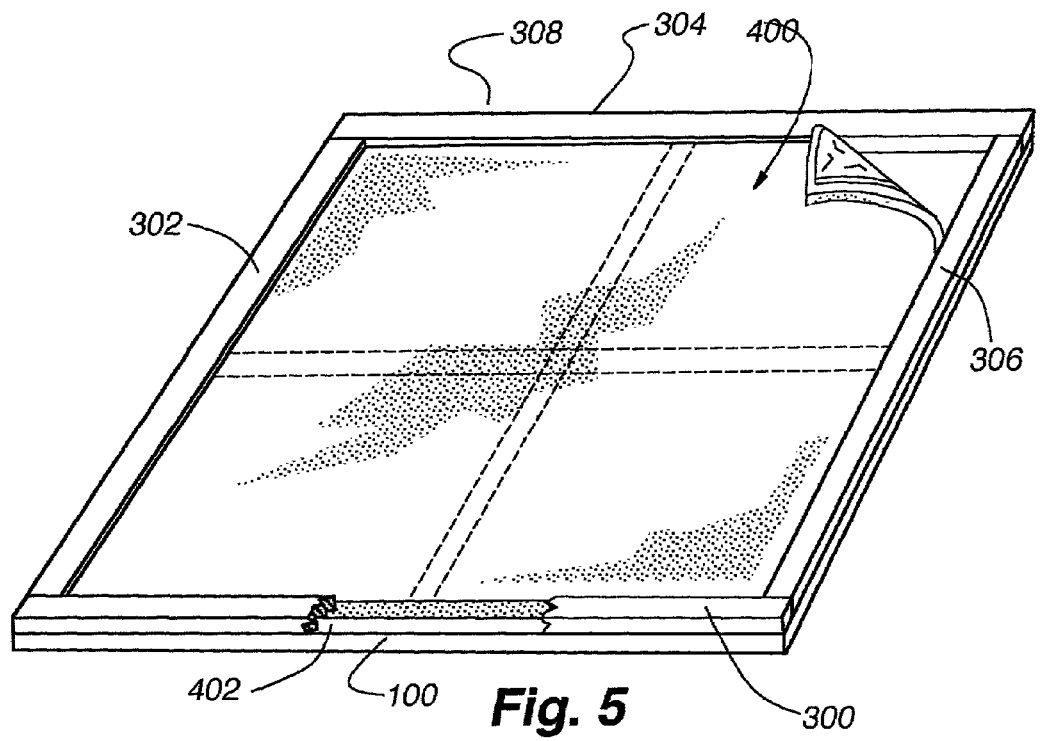
Figure 6:
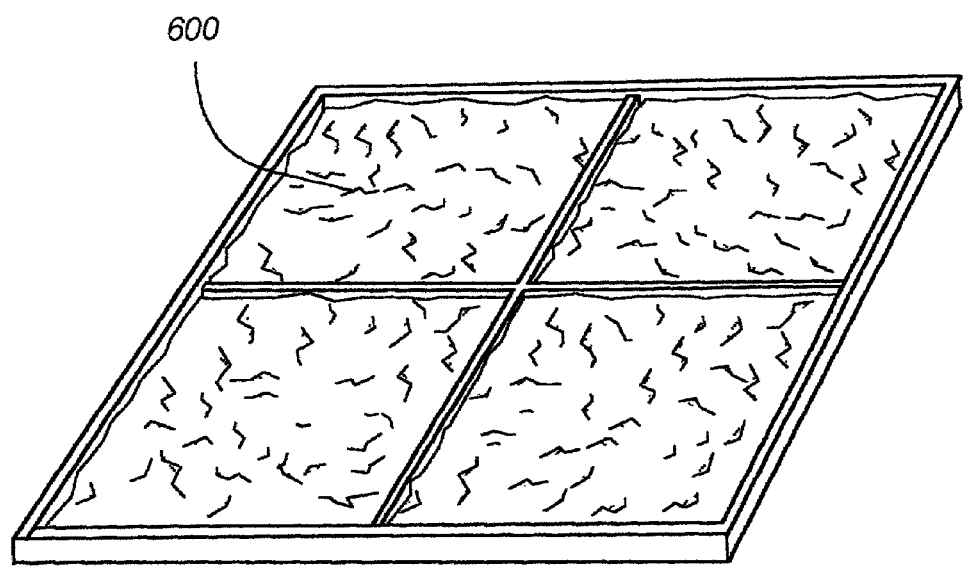

In FIG. 5, the uncured silicone 400 has cured into a flexible mold and is being lifted from frame 308 and flagstone assemblage 204. FIG. 6 depicts the finished flexible mold 600 in a position to receive uncured polyurethane plastic.

Figure 7:
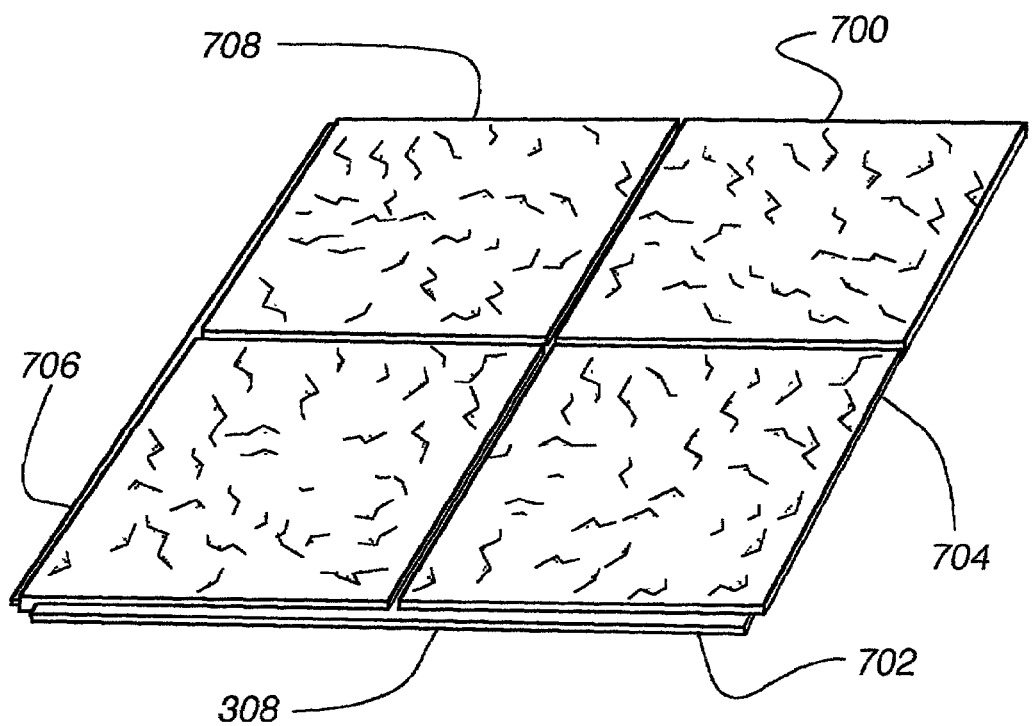
Figure 8:
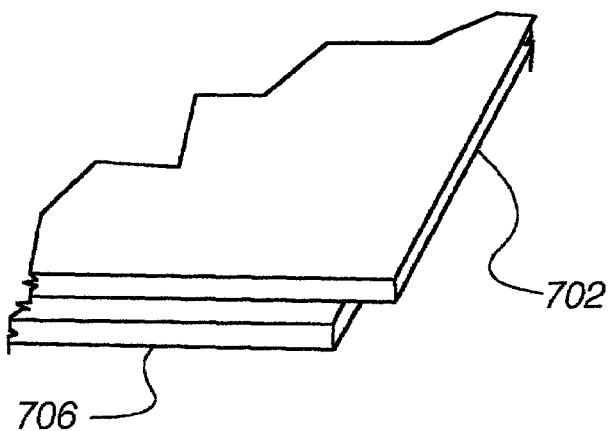
Figure 9:
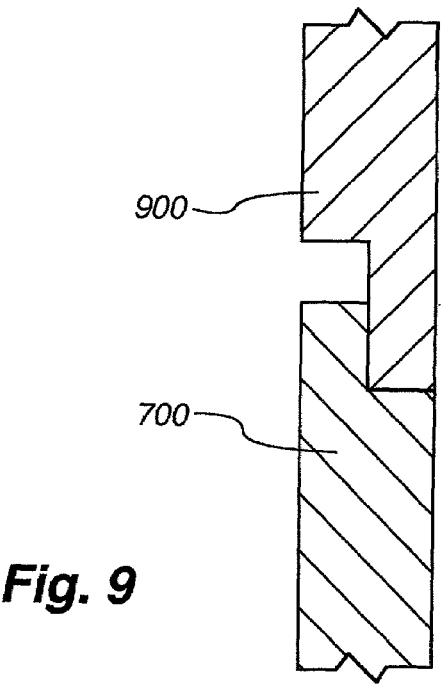

FIG. 7 depicts a polyurethane plastic panel 700 made from mold 600. Panel 700 replicates the surface of flagstone assemblage 308. Extensions 706 and 708 (not visible) are a reproduction of grout strips 200 and 202 in flagstone assemblage 204. In addition, sides 702 and 704 of panel 700 have been undercut. Panel 700 as modified with undercuts is also referred to herein as a master (or equivalently master reproduction or master cast reproduction). This can be accomplished by any known method for removing material from a plastic panel, including milling, sawing, knife cutting and laser cutting. A detail of the undercut is shown in FIG. 8, while FIG. 9 depicts a detail of how a polyurethane plastic panel (i.e., one reproduced from master 700) and another polyurethane plastic panel 900 dovetail when placed against one another.

Figure 10:
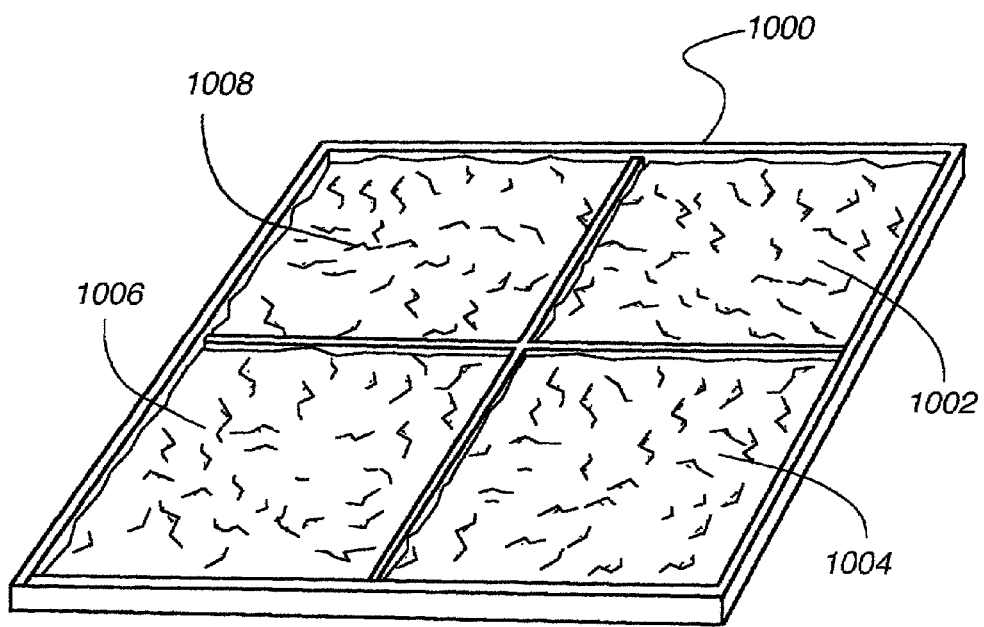

FIG. 10 depicts a flexible mold 1000 made from polyurethane plastic panel 700. Mold 1000 has four cavities 1002 through 1008 corresponding to flagstones 102, 104, 106 and 108. Mold 1000 was made using essentially the same procedures as those followed to make mold 600, except that grout strips 200 and 202 were not added or attached to polyurethane plastic panel 700.

Figure 11:
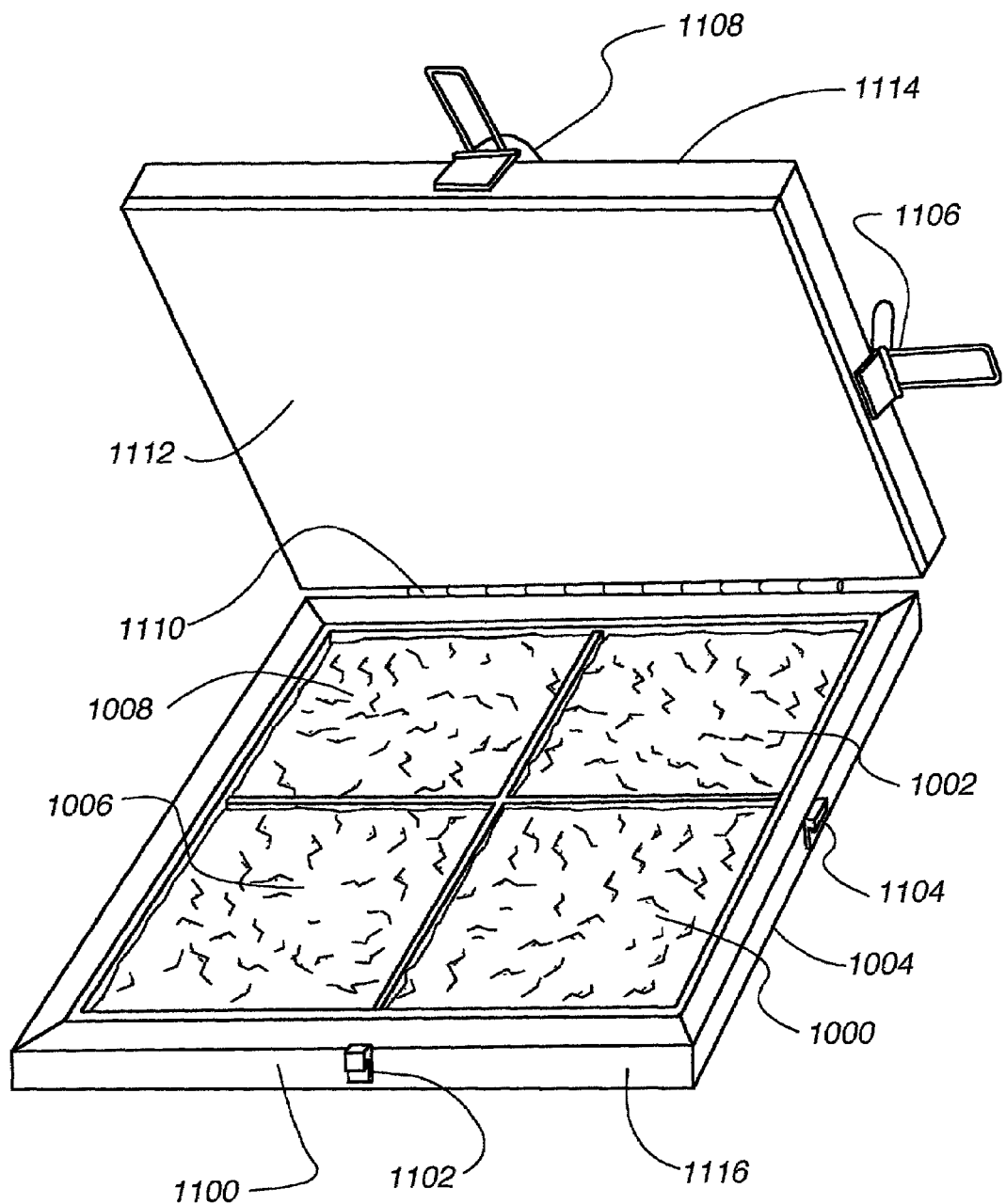

In FIG. 11, flexible mold 1000 has been placed in steel support frame 1112, which in turn is made up of steel subframes 1114 and 1116. These subframes are rotatably connected by hinge 1110. Upper subframe 1114 is fitted with a sheet of inert plastic 1112.

In practice, a production polyurethane plastic reproduction is made by filling lower subframe 1116 with uncured polyurethane plastic and rotating subframe 1114 to cover subframe 1116. Latches 1106 and 1108 are then engaged with brackets 1102 and 1104 and closed to effect a tight engagement between subframes 1114 and 1116. Inert plastic sheet 1112 prevents the uncured polyurethane plastic from sticking to subframe 1114. Once the uncured polyurethane plastic has cured, latches 1106 and 1108 are disengaged from brackets 1102 and 1104, subframe 1114 is rotated away from subframe 1116 and the cured polyurethane reproduction is removed from subframe 1116.

A polyurethane plastic reproduction made as described above can be colored on the side that replicates some or all of the cavities 1002 through 1008 of mold 1000. In one such method of coloring, one or more powdered cement dyes or other powdered coloring agents is placed in a predetermined or random pattern into at least one of cavities 1002 through 1008 of mold 1000. A fine mist of water is then sprayed over the coloring agent or agents until it dissolves or is wetted. The cavity or cavities of mold 1000 so treated are then dried. When uncured polyurethane plastic is introduced into mold 1000, the coloring agent or agents is picked up by the uncured polyurethane plastic, resulting in a polyurethane reproduction that is partially or wholly colored on the surface that replicates the contours of mold 1000.

In another method of coloring a polyurethane reproduction, one or more paints can be introduced in a predetermined or random pattern into at least one of cavities 1002 through 1008 of mold 1000. The cavity or cavities of mold 1000 so treated are then dried. When uncured polyurethane plastic is introduced into mold 1000, the dried paint or paints is picked up by the uncured polyurethane plastic, resulting in a polyurethane reproduction that is partially or wholly colored on the surface that replicates the contours of mold 1000.

In yet another embodiment of coloring a polyurethane reproduction, one or more powdered cement dyes or other powdered coloring agents is mixed with the uncured polyurethane plastic before it is introduced into mold 1000. After the uncured polyurethane plastic is introduced into the mold and is cured, the resulting reproduction is uniformly colored both internally and externally.

FIGS. 12 through 24 depict another preferred embodiment of the invention of this application. The process described is for making replicate three-dimensional replicates. These replicates reproduce the surfaces of natural stone in a form that would be difficult or impossible to make in natural stone.

Figure 12:
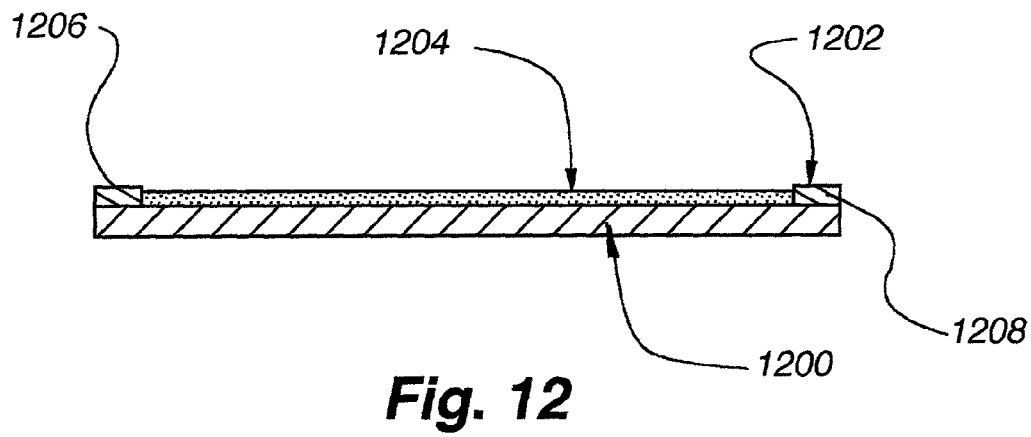

FIG. 12 depicts the making of a silicone mold. Stone 1200 bears the surface for reproduction. Stone 1200 is fitted with a dam 1208 on its upper surface. The parts of dam 1208 visible in the side view of FIG. 12 are wood strips 1202 and 1206. Dame 1208 serves to contain uncured silicone rubber 1204 poured onto stone 1200.

Figure 13:
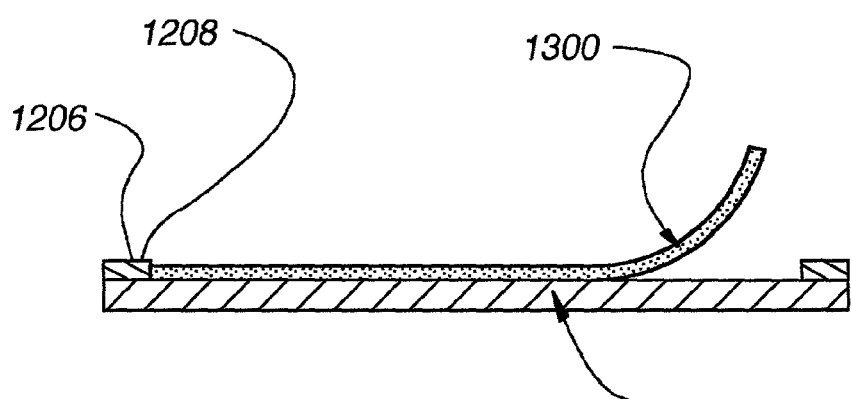

In FIG. 13, the uncured silicone 1204 has cured. Dam 1208 has been opened by removing wood strip 1202. The cured silicon rubber 1300 has become a flexible mold of stone 1200 and is being removed from stone 1200.

Figure 14:
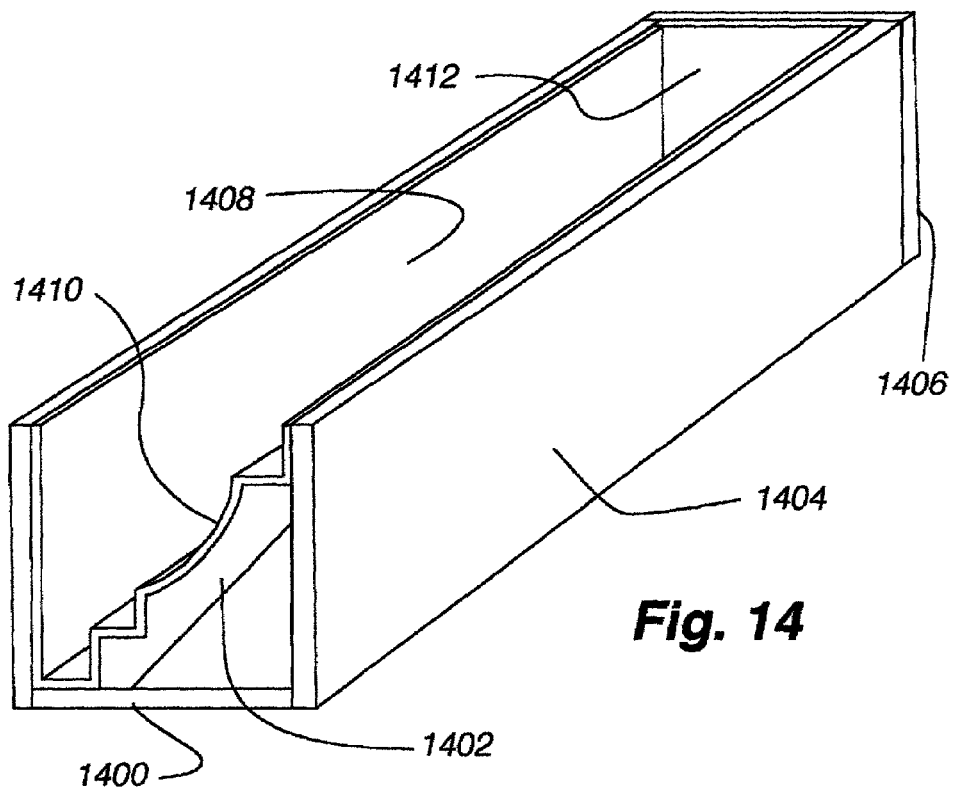
Figure 15:
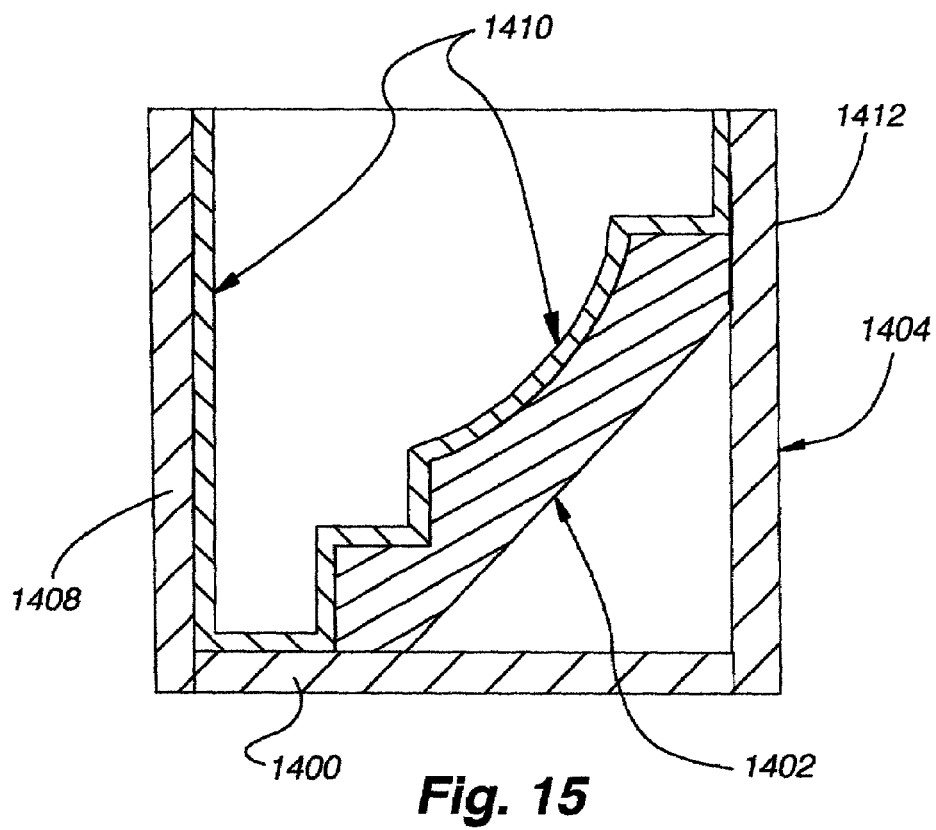

FIG. 14 depicts a rigid support structure 1412 comprising a bottom board 1400, side boards 1404 and 1408, end board 1406, and contour board 1402. The contour board 1402 determines the decorative shape of the final product. The rigid support structure 1412 is lined with a flexible mold 1410, which represents the flexible mold 1300 trimmed to fit inside support structure 1412. The flat side of rubber mold 1410 faces the inner surfaces of rigid support structure 1412, while the contoured side of rubber mold 1410 faces the interior of rigid support structure 1412. FIG. 15 is a side view of the rigid support structure 1412 of FIG. 13.

Figure 16:
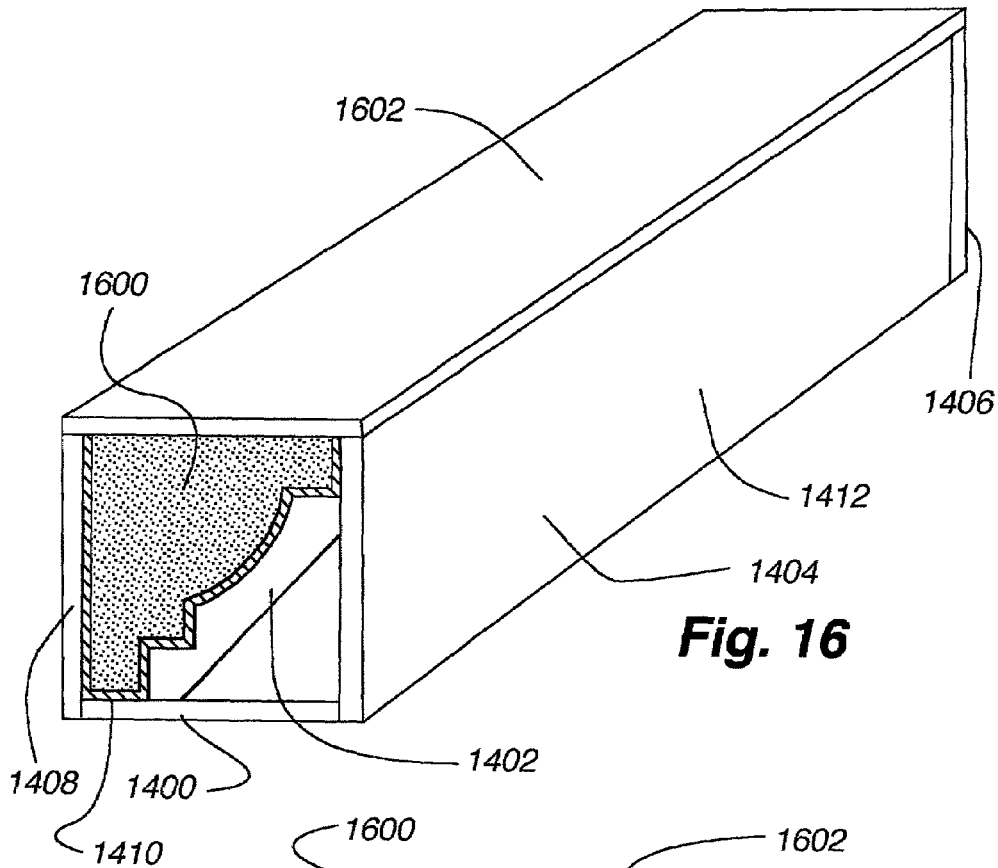
Figure 17:
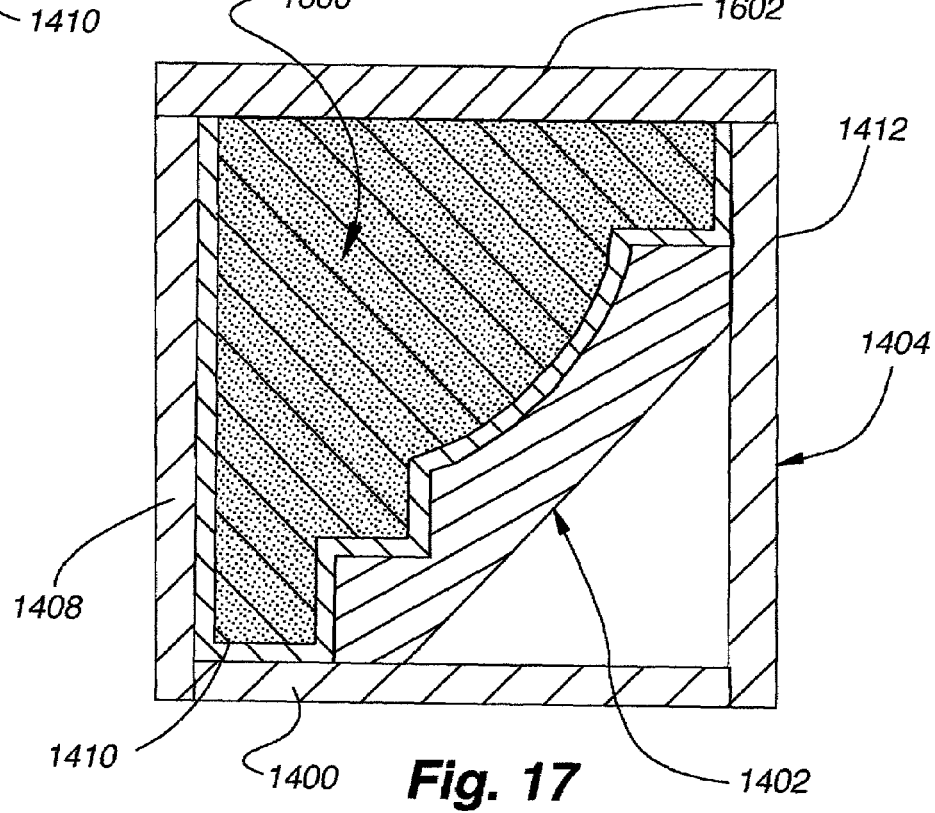

In FIG. 16, the rigid support structure 1412 has been filled with uncured polyurethane plastic 1600 and the rigid support structure 1412 closed with board 1602. A cross section from the end of the rigid support structure 1412 of FIG. 16 is shown in FIG. 17.

In FIG. 18, board 1602 has been removed from rigid support structure 1412 and cured polyurethane reproduction 1800 removed from rigid support structure 1412. The surface of reproduction 1800 where it contacts mold 1410 replicates the part of the surface of stone 1204. Reproduction 1800 is also referred to herein as a master, a master reproduction, or a master cast reproduction. A cross section from the end of rigid support structure 1412 of FIG. 18 is shown in FIG. 19.

Figure 20:
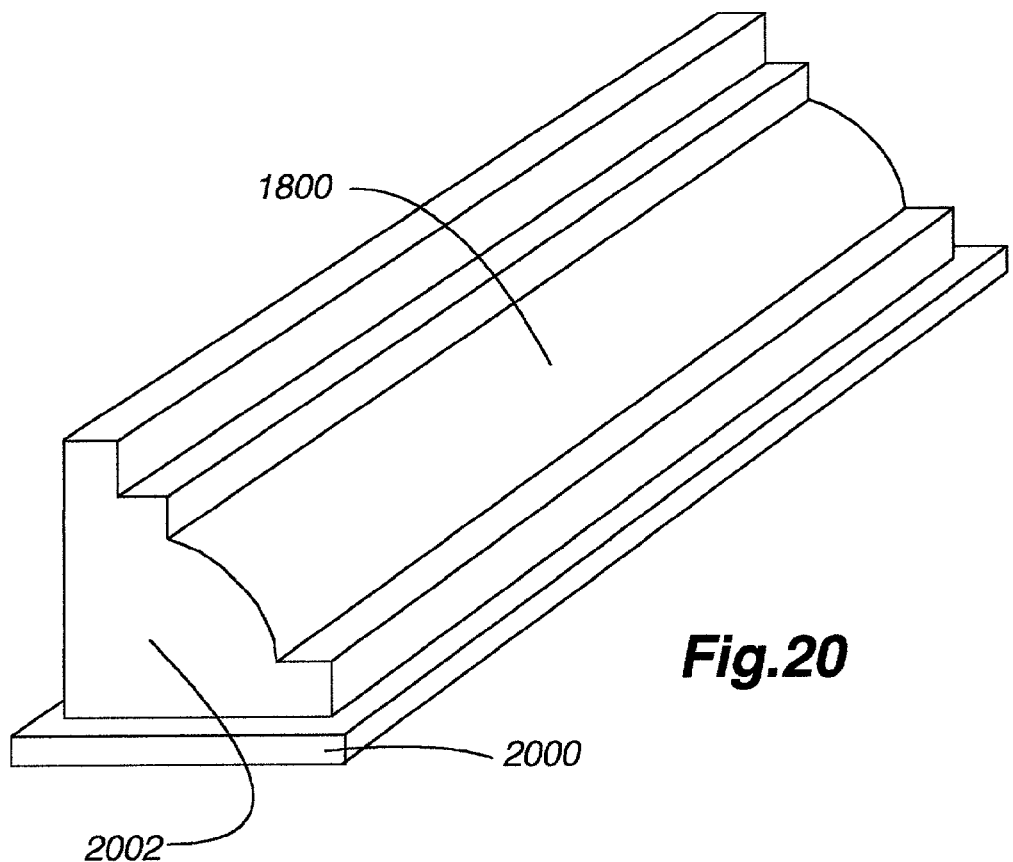
Figure 21:
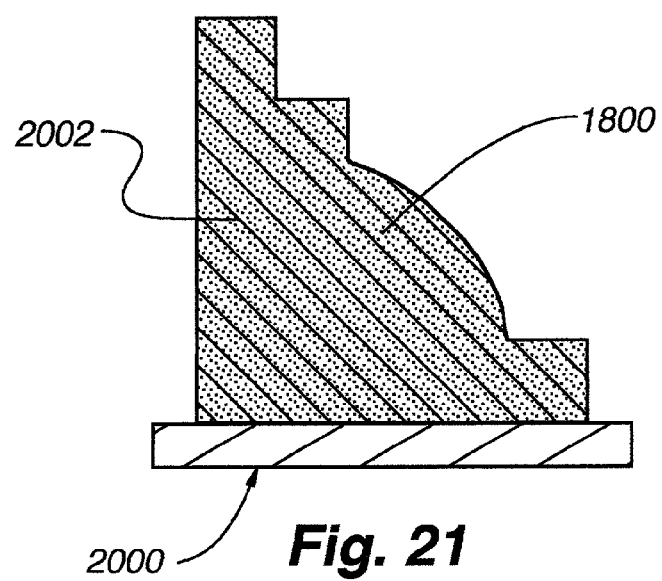

FIG. 20 depicts the cured polyurethane reproduction 1800 after it has been fully removed from rigid support structure 1412 and placed on top of a board 2000 to from assembly 2002. A cross section from the end of assembly 2002 is shown in FIG. 21.

Figure 22:
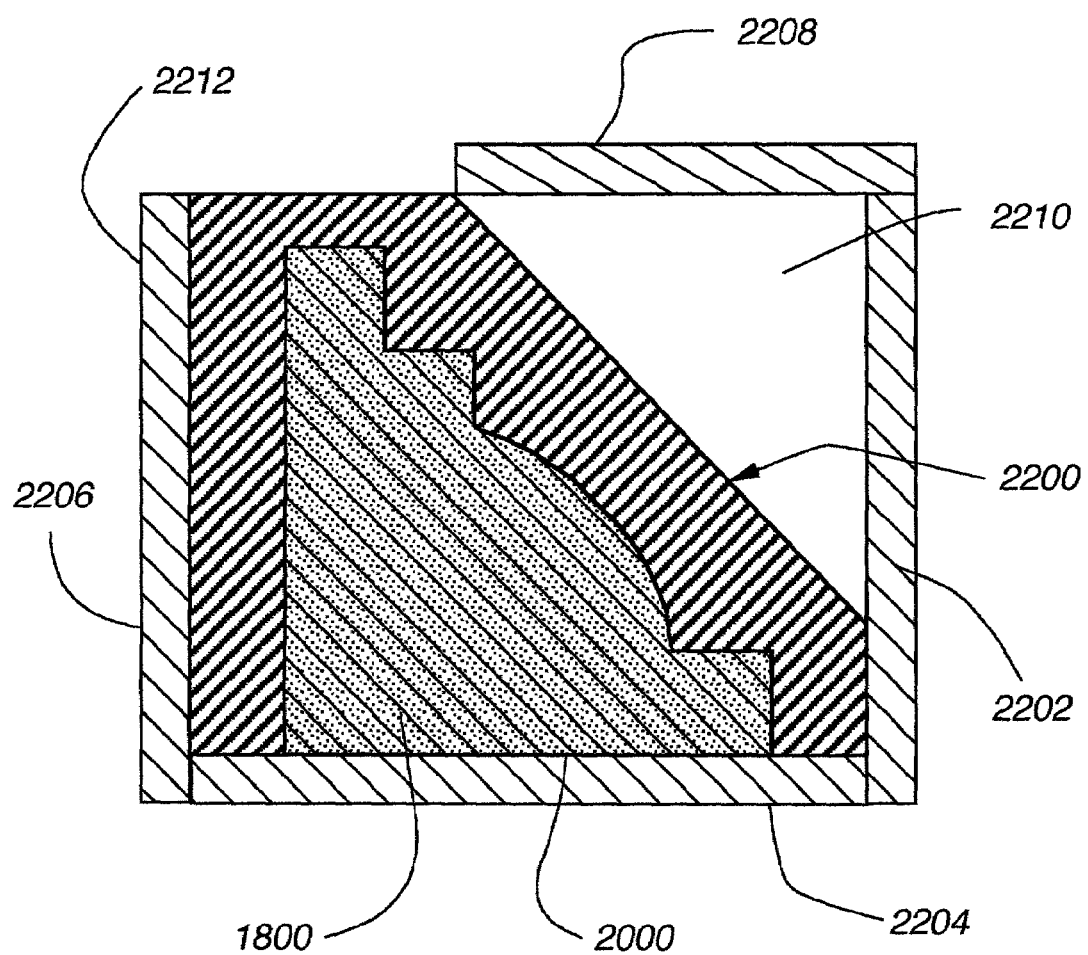

In FIG. 22, assembly 2002 has been combined with a second rigid support structure 2212. Structure 2212 comprises side board 2202 and 2206, top board 2208 and spacer board 2210. Structure 2212 is sized and configured internally so that there is a relatively uniform gap between polyurethane reproduction 1800 and the inner surfaces of second rigid support structure 2212. When uncured silicone is poured into the open top of second rigid support structure 2212 and allowed to cure, a silicone mold 2200 of polyurethane reproduction 1800 results.

Figure 23:
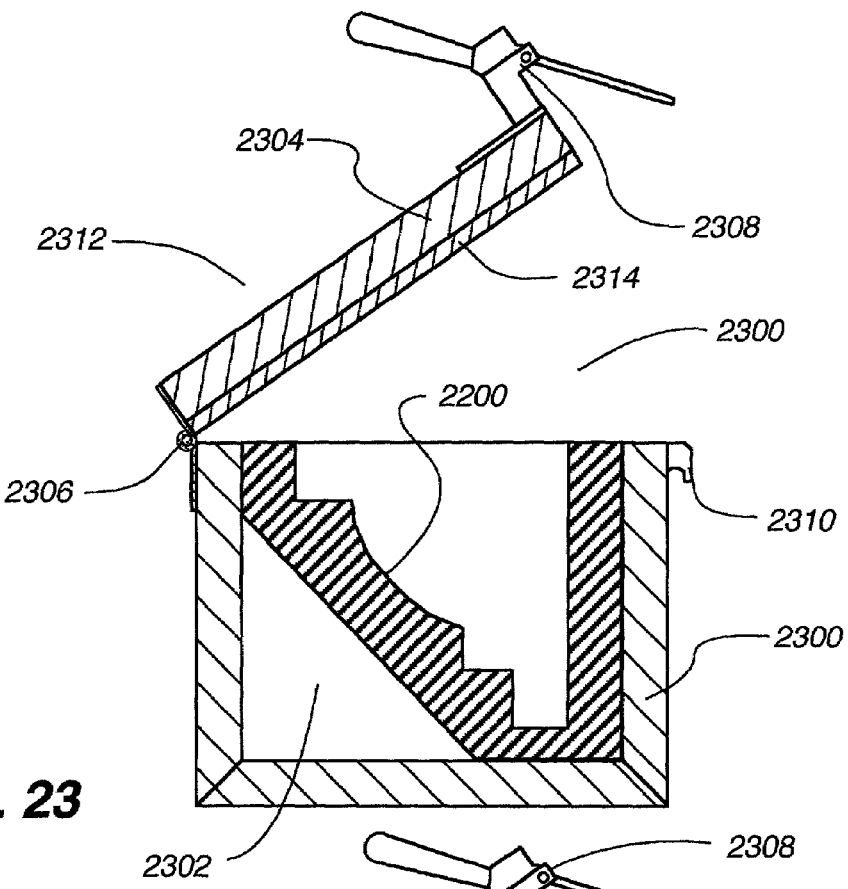

FIG. 23 depicts a third rigid support structure 2300. While the first rigid support structure 1412 and second rigid support structure 2212 were made of wood, rigid support structure 2300 is made of structural steel. Rigid support structure 2300 is sized so that it fits silicone mold 2200 as closely as possible.

As shown, flexible mold 2200 has been placed in steel support structure 2312, which in turn is made up of steel subframes 2300 and 2304. These subframes are rotatably connected by hinge 2306. Upper subframe 2304 is fitted with a sheet of inert plastic 2314.

Figure 24:
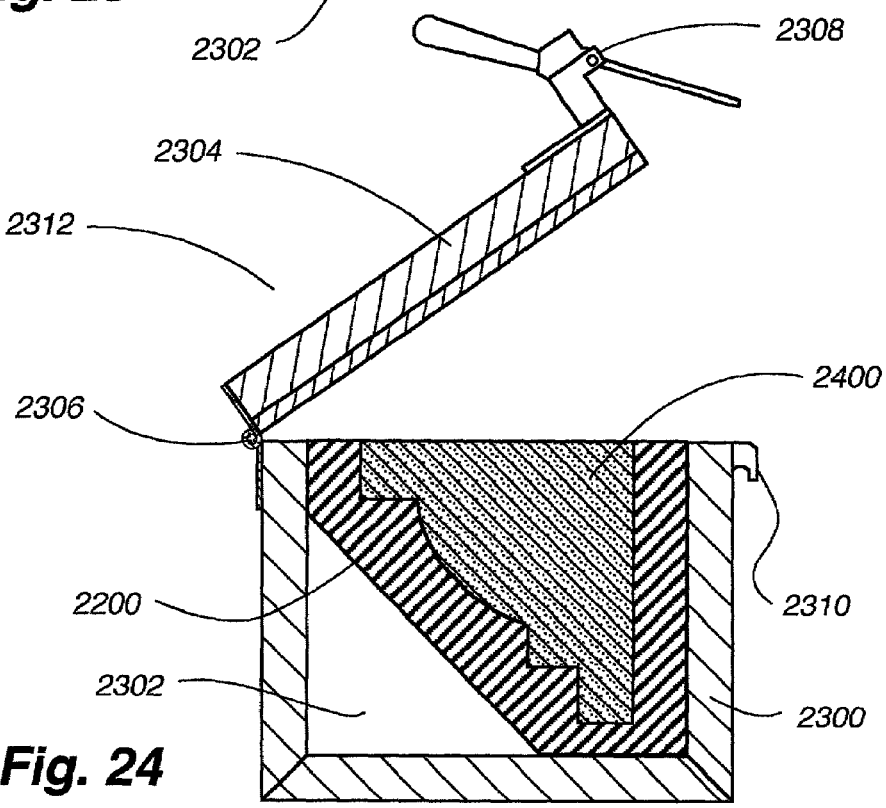

In practice, a polyurethane plastic reproduction is made by filling lower subframe 2302 with uncured polyurethane plastic and rotating subframe 2304 to cover subframe 2302. Latch 2308 is then engaged with bracket 2310 and closed to effect a tight engagement between subframes 2304 and 2302. Inert plastic sheet 2314 prevents the uncured polyurethane plastic from sticking to subframe 2304. Once the uncured polyurethane plastic has cured, latch 2308 is disengaged from bracket 2310 and subframe 2304 is rotated away from subframe 2302, as shown in FIG. 24. The cured polyurethane reproduction 2400 is then removed from subframe 2304. Polyurethane reproductions made as described above can be colored by various methods, including those described above.

Figure 25:
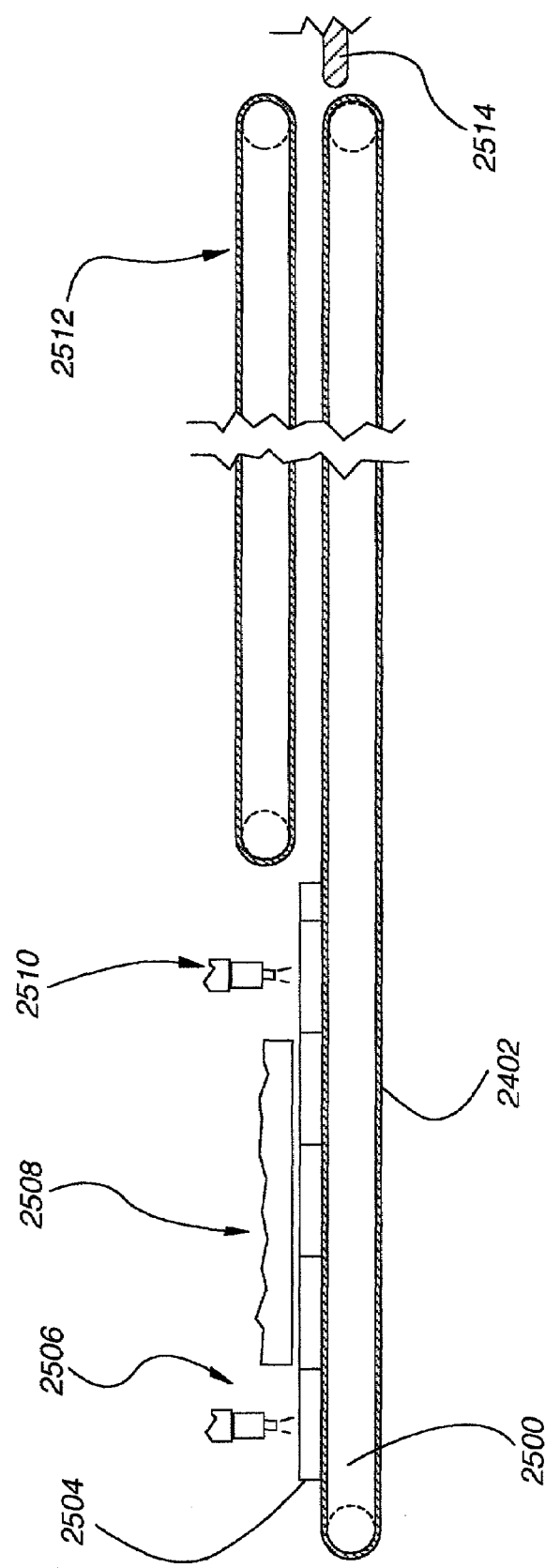

FIG. 25 depicts a machine 2500 for the continuous production of polyurethane reproductions. Lower conveyor 2502 is loaded continuously with molds 2504, which are made from one or more natural articles. Once a mold 2504 is placed on lower conveyor 2502, coloring one or more coloring dispensers 2506 introduce one or more coloring agents and paints, as well as water where required, into the interior of the mold 2504 so as to color the reproductions produced from molds 2504 by various methods, including the methods described above. Lower conveyor 2502 then conveys molds 2504 to one or more heaters 2508, which dried all coloring agents, paints and water in molds 2504, and also heats mold 2504.

Lower conveyor 2502 then conveys molds 2504 to plastic dispenser 2510, which fills molds 2504 with a castable polyurethane. Next, lower conveyor 2502 conveys molds 2504 under upper conveyor 2512, which prevents the castable urethane from foaming beyond the confines of molds 2504. Finally, lower conveyor 2502 conveys molds 2504 beyond upper conveyor 2512 and onto receiving platform 2514, where the cured reproductions are removed from molds 2504.

Alternative Procedures

The previously described procedures and materials can be somewhat modified without departing from the scope and spirit of the present invention. For example, rather than bringing an original object (an object found in nature or a manmade object) to a predetermined configuration (e.g., by cutting such an original object to fit within the confines of frames used to hold molds such as those frames depicted in FIGS. 3, 4, 5, 6 and 11), an impression can be taken of at least a portion of an original object that remains where it is located, i.e., it is not placed within such frames. For example, an impression of a portion of a large object found in nature (e.g., a portion of a huge, immovable stone, boulder, etc.) could be taken in the field. To this end, an open faced "box" could be securely held, or constructed, around a portion of the object that one desires to replicate. The securely held box could then be sealed around its open face edges and then filled with a first, impressionable material. This first impressionable material could be a flowable mold making material such as a semi-liquid silicone that, upon curing or drying (in the box), captures the surface morphology, texture, etc. of the object to be replicated. This first impressionable material could also be a precursor to an inflexible material (e.g., a polymeric material or a non-polymeric material) such as those used to create certain hereinafter more fully described thermosetting polymeric materials. That is to say that these impressionable materials are capable of replicating the surface morphology, texture, etc. of a solid object that they come into contact with while in a semi-fluid (impressionable) state and maintaining that surface morphology, texture, etc. after the originally impressionable material has cured, dried, cooled, etc., and removed from its impression-forming contact with the solid object it replicates. In a less preferred, but still operable, embodiment of these alternative procedure(s), such impressionable materials could even be a non-polymeric material (e.g., a crystalline material) such as plaster of Paris.

Impressions of manmade objects, e.g., manmade carvings in the face of a block of marble, wood, metal, thermoset resin, ceramic material, etc., three dimensional manmade objects such as castings of objects of art, mold parts, etc. also could be obtained in a manner similar to that just described with respect to gaining an impression of an object found in nature. In either case, a resulting impression-bearing first mold material can be employed in the ways previously described in this patent disclosure in order to produce a master reproduction, and then a final product bearing a reproduction of the surface morphology of the original object (be it a natural or manmade object). Thus, the heretofore described methods for making an end product object that replicates a portion of a surface of an original article may, in an alternative method, comprise: (1) making a first mold that replicates at least part of the surface of the original object, (2) filling said first mold with a first castable material to produce a cast reproduction, (3) modifying said cast reproduction to form a master reproduction, (4) making a second mold that replicates at least part of the surface of the master reproduction, (5) filling said second mold with a second castable material, and (6) curing the second castable material to produce a cast article that replicates the surface of the original object.

Materials

Several different types of materials are required to carry out the hereindescribed invention. Generally speaking, applicant's principal required materials include: (1) those material(s) from which the cast reproduction and the cast article are made, (2) those material(s) from which the molds are made and (3) those materials from which the coloring agents are made. Various materials within these three groups may be selected depending upon whether an original article to be replicated is a manmade object (e.g., the surface of a wall constructed from an array of bricks or stones, a carved item such as a decoratively carved panel or a machined object such as a mold component) or an object found in nature (e.g., a stone having a surface that one desires to replicate).

The materials from which applicant's reproductions (i.e., end products) are made preferably will be those thermoset polymers (a/k/a thermoset resins) that produce extremely hard, rigid articles having the mechanical strength and dimensional stability required of a given end product. Most preferably, the thermoset polymer(s) selected also should be able to accept pigment coloration in general and metal oxide pigment coloration in particular (especially during the thermoset polymer curing process). Some of the more preferred thermoset polymers for the practice of this invention will include, but not be limited to: (1) urethanes, (2) phenolics, (3) epoxies, (4) alkyds, (5) allylics, (6) aminos (melamine and urea), (7) polyesters and (8) silicones. More specific thermosetting resin materials that may be especially preferred for the practice of this invention may include, but by no means be limited to: (1) polyether polyurethane, (2) polyester polyurethane, (3) polyvinylchloride, (4) polycarbonate, (5) polypropylene and (6) epoxy resin. Those skilled in this art also will appreciate that almost all commercially available thermoset polymers contain various additives. Such additives often include catalytic agents, stabilizers, fillers, colors, plasticizers, flame retardants, blowing agents, cross-linking agents and other more specialized agents such as ultraviolet light inhibitors and fungicidal agents.

The polyurethane materials most preferred for the practice of this invention are those rigid polyurethane materials whose ingredients are made and/or sold by Urethane Technologies Corporation of Newburgh, N.Y. under their designation "UTC-6022-7.5FR". Their particular ingredient system is provided in two components: Part A and Part B. To the best of applicant's knowledge, Part A is a resin component containing polyols, blowing agents, catalytic agents and having a viscosity of 150-350 cps at 77° F. and a specific gravity of 1.22 to 1.24 at 77° F. Part B is a polyisocyanate component containing polymethylene, polyphenyl, isocyanate and having a viscosity of 1000 to 1200 cps and a specific gravity of 1.10 at 77° F. When appropriately mixed, and dispensed (e.g., by casting, spraying, etc.) these two main ingredients produce a cured polyurethane material having a density that ranges from about 5 pounds per cubic feet to about 25 pounds per cubic feet. The preferred mixing ratio of component A (UTC-6022-7.5 FRA) to component B (UTC-6022-7.5 FRB) is about 1:1 by weight. The reactivities of these ingredients, at 77° F., are as follows: (1) cream time 48-52 seconds, (2) string gel time 1 minute to 1 minute and 20 seconds, (3) rise time 4 minutes and 5 seconds to 4 minutes and 25 seconds, free rise core density 7.0-7.5 pounds/ft$^3$ and mold dwell time 8 to 9 minutes. These two components can be dispensed (e.g., by a hand, mixing gun, etc.) and reacted (e.g., at temperatures of 60-250° F.) in ways known to those skilled in this art.

In certain somewhat less preferred embodiments of this invention, ceramic materials can be employed to make the first casting and/or the second casting. Those skilled in this art will appreciate that the most essential ingredient in a ceramic material is clay (a hydrated compound of aluminum and silicon $H_2 Al_2 Si_2 O_9$, but also containing relatively small amounts of various other compositions such as ferric oxide $Fe_2O_3$, silica $SiO_2$, calcium carbonate $CaCo_3$). Other ingredients commonly found in clays include feldspar, quartz and dolomite. Be that as it may, one of the points to be made here is that the first and/or second materials (e.g., thermosetting polymers, ceramic materials, metals, etc.) that are respectively placed in the first and/or second mold should be castable materials that are capable of faithfully replicating the details of the surface of the original object and then curing (or drying or cooling) to form a solid, hard material that also faithfully replicates the details of the surface of the original object.

The materials from which the first and/or second molds are made can be flexible or inflexible end product materials (e.g., flexible polymers, inflexible polymers, crystalline materials, metal castings and the like). Most preferably, the polymeric materials employed for the second molds will be those that produce flexible molds having the mechanical strength, durability and flexibility needed for repeated use of said second molds. The materials from which these second molds are made also should: (1) be able to repeatedly withstand those temperatures (e.g., temperatures up to about 300° Fahrenheit) used to create and/or cure the ingredients from which a given cast article is made, (2) not chemically or mechanically bond with a given second castable material (e.g., a thermosetting resin) being employed and (3) not take up large quantities (e.g., more than 10% of its weight) of the liquid used to create the coloring agent/liquid suspensions that may be employed in the practice of this invention. Some of the more preferred flexible mold materials are those polymers whose final forms display the above noted qualities. The more preferred of these silicone based materials are so-called silicone rubbers. The most preferred silicone based material for the practice of the hereindisclosed invention is a silicone rubber made and sold by Rhodia, VSI of Troy, N.Y. as their "VI-SIL, V-1065-S" product. Such silicone rubbers will preferably have a durometer reading from about 15 to about 75.

Again, the materials from which the first mold is made also can be flexible or inflexible end product materials (e.g., flexible polymers, inflexible polymers, crystalline materials, metal castings and the like). For example, they can be made from the same mold materials used to make the preferred second molds (e.g., silicone rubber) or the same "inflexible" polymer materials from which the end products are made. Indeed, even non-polymeric materials such as plaster of Paris, or metal castings could be employed. The materials from which the first molds are made will not normally be repeatedly used, or be used in conjunction with coloring agents. Hence, there will generally be more latitude in selecting the material(s) for making a given first mold relative to the material(s) that can be selected for making a given second mold.

The preferred powdered coloring agent(s) for the practice of this invention is (are) one or more inorganic pigment(s). Such inorganic pigments may include, but are not limited to: (1) metal oxides (e.g., oxides of iron, titanium, zinc, cobalt, chromium, etc.), (2) metal powder suspensions (e.g., suspensions of gold, silver, tin, copper, bronze, etc.), (3) earth colors (e.g., siennas, ochers, umbers, etc.), (4) carbon black and/or mixtures thereof. Of these, the more preferred inorganic pigments are metal oxides and/or carbonates, and especially those of iron. These inorganic pigments are especially efficacious in producing the coloring schemes displayed by certain stones found in nature. They also are particularly effective in coloring the surfaces of many different thermosetting resin materials. Particularly preferred iron oxide compounds or compositions in this regard are: (1) iron oxide, metallic brown (a naturally occurring earth, principally ferric oxide, to which various extenders are normally added), (2) iron oxide, yellow (hydrated ferric oxide, which is a precipitated pigment of finer particle size and greater tinctorial strength than the naturally occurring oxides such as ocher, and having particularly good lightfastness qualities), (3) iron oxide, black (ferrosoferric oxide, ferroferric oxide, black rouge), (4) iron oxide, red (e.g., pigments of ferric oxide commonly referred to as burnt sienna, Indian red, red iron oxide, red oxide, Turkey red and rouge) and (5) ferric oxide (ferric oxide, red, iron oxide, red iron trioxide and ferric trioxide). A particularly preferred iron carbonate coloring agent is iron "oxide", brown (iron carbonate, iron subcarbonate, which are usually employed with ferric hydroxide and ferrous hydroxide in varying concentrations). Titanium dioxide is a particularly preferred coloring agent when a white color is desired (a white color alone, or in a coloring system needing a white color component). It also should be appreciated that use of mixtures of any such pigments may be particularly preferred for the practice of the hereindisclosed invention—especially when trying to imitate the colors of certain stones (e.g., so-called sandstones) found in nature.

In certain other particularly preferred embodiments of this invention, a powdered inorganic coloring agent ingredient will be the main component of a coloring composition that further comprises certain secondary ingredients. These secondary ingredients may be pigment binders, ultraviolet light inhibitors, flame retardant agents, anti-microbial agents, insect repellants, extenders and the like. If used at all, these secondary ingredients will preferably comprise no more than about 30% by weight of the powdered, inorganic coloring agent ingredient/secondary ingredient composition. Coloring agent compositions having from about 5% to about 20% (by weight) of such secondary ingredients are somewhat more preferred. A particularly preferred pigment binder or film-forming ingredient for creating applicant's powdered, inorganic coloring agent/secondary ingredient coloring formulations will be binder materials comprised of mixtures of silicone dioxide (30-70% by weight of the binder mixture) and polytetrafluoroethylene (30-70% by weight of the binder mixture). Applicant especially prefers those pigment binders marketed by Development Associates, Inc. of North Kingstown, R.I. under their product name "Z-8261".

Suitable ultraviolet absorbers for the practice of this invention may include, but are not limited to, benzophenones, benzotriazoles, substituted acrylonitriles and phenolnickel complexes. Suitable flame-retarding agents may include, but are not limited to, chlorinated organic compounds such as chlorendic anhydride, alumina trahydrate, ammonium sulfamate, zinc borate and various organic phosphates and phosphonates. Suitable fungicides may include, but are not limited to copper oxychloride, copper naphthenate and dithiocarbamate. Most preferably, such ultraviolet absorbers, flame-retarding agents, fungicides and the like will not, in total, constitute more than about 8% by weight of the total weight of the end product.

In yet another highly preferred embodiment of this invention, the coloring agents are dispensed into a second flexible mold cavity in a powdered form. For example, such powders could be simply sprinkled, brushed, blown, etc., in their powdered forms, into the cavity or cavities of the second mold prior to filling said mold with the second castable (e.g., a thermosetting resin material). In the most preferred embodiments of this invention, however, the powdered coloring agent(s) become a component of a coloring agent suspension that is placed in, or created in, the cavity or cavities of the second mold before the second castable material(s) is (are) poured, injected, blown, etc. into said cavity or cavities. That is to say that, in this highly preferred embodiment, before the second castable material(s) is (are) poured, injected, sprayed, etc. into the second mold cavities, the powdered coloring agent becomes a component of a two (or more) phase coloring system. One phase is comprised of the particles of the powdered coloring agent(s) and their associated secondary ingredients (if any) and a second phase is comprised of a liquid suitable for creating a powdered coloring agent/liquid suspension used to impart the pigment color(s) to the mold side surface of the cast article (i.e., to the "face side" of the end product of this production method). In a less preferred, but still operable alternative, such a powdered coloring agent/liquid suspension can be pre-formulated and then introduced into (e.g., by spraying, brushing, etc.) the cavities of the second mold. Such a suspension also could be an added ingredient of an entire composition (e.g., polyurethane/powdered coloring agent/liquid suspension) from which a second thermosetting resin (s) material(s) is (are) made in a thermosetting reaction.

In another particularly preferred embodiment of this invention, the powdered coloring agent/liquid suspension will be created in the following manner. First, one or more coloring agents (in powdered form) are introduced (e.g., by sprinkling, spraying, brushing, etc.) into one or more cavities of a second, flexible polymer, mold. An appropriate suspension creating liquid is then sprayed over the powdered inorganic pigments (in the alternative, the liquid could be sprayed into the cavities first and the powdered coloring agent added thereafter). These two materials are then mixed (preferably by brush stroke action) to form the desired powdered coloring agent/liquid suspension ("the resulting suspension"). The resulting suspension will generally have the consistency of wet paint or stain. In some of the most preferred embodiments of this invention the brushing action (e.g., by human hand) should be sufficient to create the suspension, but not sufficient enough to create a thoroughly homogeneous pigment/liquid composition. This lack of homogeneity serves to create regions (e.g., streaks) having different colors and this quality generally tends to give the resulting cast reproduction a more "natural" (e.g., stonelike) appearance. That is to say that products colored in this way tend to better replicate the colors, texture, and visual appearance of certain natural objects such as certain stones.

The liquid(s) used to create the coloring agent/liquid suspension is (are) preferably polar solvents (e.g., an alcohol such as ethyl alcohol, methyl alcohol and the like, water and/or weak acids). Most preferably the polar solvent(s) employed is (are) not corrosive toward, or readily absorbed by, the material (e.g., silicone) from which the second mold is made. In the case of using iron oxide type inorganic pigments in the practice of this invention, denatured alcohol is a particularly preferred liquid for the creation of applicant's powdered coloring agent/liquid suspensions.

Those skilled in this art will appreciate that the embodiments discussed above are exemplary of the present invention. They are not, however, intended to limit the scope of the claims of this patent application. Many other substances and techniques, different from those discussed above, can be used. That is to say that all changes and modifications that come within the spirit of the present invention are intended to be protected by the following patent claims.

What is claimed is:

1. A method for making a cast thermosetting polymer masonry wall panel reproduction that replicates on at least a part of its exterior surface, the surface and surface texture of an array of articles each of which is one of a natural stone article or a brick article while simultaneously imparting color to the exterior surface of the replicated articles in the cast masonry wall panel reproduction, said method comprising:

using a mold having a cavity that replicates the surface of each one stone or brick article to be replicated in the array of articles in the masonry wall panel production;

introducing castable thermosetting polymer material into the cavity of the mold;

adding a powdered iron oxide compound to the cavity in the mold prior to introducing the thermosetting polymer material into said mold;

locating the powdered iron oxide compound on a surface of the cavity to be retained by the introduced thermosetting polymer material over the exterior surface of each replicated article in the cast masonry wall panel reproduction;

curing the thermosetting polymer material sufficiently in the mold to retain the powdered iron oxide compound over the exterior surface of each replicated article in the cast masonry wall panel reproduction; and imparting color and surface texture to the exterior surface of each replicated article from the powdered iron oxide compound retained over the exterior surface of each replicated article in the cast masonry wall panel reproduction.

2. The method of claim 1 wherein the powdered iron oxide compound includes iron oxide selected from the group consisting of: (1) iron oxide, metallic brown, (2) iron oxide, yellow, (3) iron oxide, black, (4) iron oxide, red and (5) ferric oxide.

3. The method of claim 1 further including:
wetting the powdered iron oxide compound with a liquid wetting agent within the cavity before introducing the castable material.

4. The method of claim 3 further including:
mixing the liquid wetting agent and the powdered iron oxide compound in the cavity before introducing the castable material.

5. The method of claim 3 further including:
brushing the powdered iron oxide compound and the liquid wetting agent to form a liquid suspension in the cavity before introducing the castable material.

6. The method of claim 5 further including:
drying the liquid suspension within the cavity before introducing the castable material.

7. The method of claim 1 further including:
placing a plurality of different powdered iron oxide compounds into the cavity and distributing the different powdered iron oxide compounds among themselves before introducing the castable material.

8. The method of claim 7 wherein the powdered iron oxide compounds each contain iron oxide that are selected from the group consisting of: (1) iron oxide, metallic brown, (2) iron oxide, yellow, (3) iron oxide, black, (4) iron oxide, red and (5) ferric oxide.

9. The method of claim 1 further including:
configuring the cast reproduction to facilitate installing multiple ones of the masonry wall panels adjacent to one another.

10. The method of claim 1 wherein the castable thermosetting polymer material comprises a thermoset polymer selected from the group consisting of: (1) urethanes, (2) phenolics, (3) epoxies, (4) alkyds, (5) allylics, (6) aminos, (7) polyesters and (8) silicones.

11. The method of claim 1 wherein the castable thermosetting polymer material comprises polyurethane.

12. The method of claim 1 wherein the castable thermosetting polymer material is selected from the group consisting of: (1) polyether polyurethane, (2) polyester polyurethane, (3) polyvinylchloride, (4) polycarbonate, (5) polypropylene and (6) epoxy resin.

13. The method of claim 1 wherein the mold is flexible.

14. The method of claim 13 wherein the mold is formed from polymer.

15. The method of claim 14 wherein the mold is formed from silicone material.

16. The method of claim 14 wherein the mold is formed from a silicone rubber material.

17. The method of claim 13 further comprising:
placing the mold in a closable rigid support structure; and thereafter
introducing the castable thermosetting polymer material and adding the powdered iron oxide compound.

18. The method of claim 17 further comprising:
confining the mold and the castable thermosetting polymer material within the support structure while the thermosetting polymer material cures.

19. A method for making a cast thermosetting polymer reproduction that replicates on a part of its surface, the surface of an object found in nature, said method comprising:

using a mold having a cavity that replicates the surface of the object to be replicated;

introducing castable thermosetting polymer material into the cavity in the mold;

adding a powdered metal oxide pigment and a pigment binder comprising a mixture of silicone dioxide and polytetrafluoroethylene to the castable thermosetting polymer material to impart color to the cast reproduction; and curing the thermosetting polymer material sufficiently in the mold to retain the shape of the cast reproduction.

20. The method of claim 19 wherein the powdered metal oxide pigment is a powdered iron oxide pigment.

21. The method of claim 20 wherein the powdered iron oxide pigment is selected from the group consisting of: (1) iron oxide, metallic brown, (2) iron oxide, yellow, (3) iron oxide, black, (4) inn oxide, red and (5) ferric oxide.

22. The method of claim 19 further including:
creating texture as part of an exterior surface of the cast reproduction by imparting the powdered metal oxide pigment as part of the exterior surface of the cast reproduction.

23. The method of claim 19 further including:
wetting the powdered metal oxide pigment with a liquid wetting agent within the cavity before introducing the castable material.

24. The method of claim 23 further including:
mixing the liquid wetting agent and the powdered metal oxide pigment in the cavity before introducing the castable material.

25. The method of claim 23 further including:
brushing the powdered metal oxide pigment and the liquid wetting agent to form a liquid suspension in the cavity before introducing the castable material.

26. The method of claim 25 further including:
drying the liquid suspension within the cavity before introducing the castable material.

27. The method of claim 19 further including:
placing a plurality of different powdered metal oxide pigments into the cavity and distributing the different powdered metal oxide pigments among themselves before introducing the castable material.

28. The method of claim 19 further including the step of:
creating texture as part of the exterior surface of the cast reproduction by imparting the powdered metal oxide pigment as part of the exterior surface of the cast article.

29. The method of claim 19 wherein the object found in nature is a stone.

30. The method of claim 19 wherein the object found in nature is an array of stones.

31. The method of claim 19 applied to replicate one of an original object or the object found in nature, wherein the object is one of a natural stone article or a brick article, each article having a surface texture, and the cast reproduction is a masonry wall panel having an outside surface texture replicating the surface texture of the object.

32. The method of claim 31, further including:
configuring the cast reproduction to facilitate installing multiple ones of the masonry wall panels adjacent to one another.

33. The method of claim 19 wherein the castable thermosetting polymer comprises a thermoset polymer selected from the group consisting of: (1) urethanes, (2) phenolics, (3) epoxies, (4) alkyds, (5) allylics, (6) aminos, (7) polyesters and (8) silicones.

34. The method of claim 19 wherein the castable thermosetting polymer material comprises polyurethane.

35. The method of claim 19 wherein the castable thermosetting polymer material is selected from the group consisting of: (1) polyether polyurethane, (2) polyester polyurethane, (3) polyvinylchloride, (4) polycarbonate, (5) polypropylene and (6) epoxy resin.

36. The method of claim 19 wherein the mold is flexible.

37. The method of claim 36 wherein the mold is formed from a polymer.

38. The method of claim 37 wherein the mold is formed from silicone material.

39. The method of claim 37 wherein the mold is formed from silicone rubber material.

40. The method of claim 36 further comprising:
placing the mold in a closable rigid support structure; and thereafter
introducing the castable thermosetting polymer material and adding the powdered metal oxide pigment.

41. The method of claim 40 further comprising:
confining the mold and the castable thermosetting polymer material within the support structure while the thermosetting polymer material cures.

42. The method of claim 19 further comprising:
making a first mold that replicates at least part of the surface of said object;
making a first reproduction by filling the first mold with a castable material;
forming a master reproduction from the first reproduction; and
making a second mold that replicates at least a portion of the master reproduction, the second mold having the cavity; and
using the second mold to perform the aforesaid steps of introducing the castable thermosetting polymer material into the cavity, adding the powdered metal oxide pigment to the cavity, and curing the thermosetting polymer material in the cavity.

43. The method of claim 42 further comprising:
using said second mold to produce a plurality of cast reproductions.

* * * * *